(12) United States Patent
Philimis et al.

(10) Patent No.: US 12,066,006 B2
(45) Date of Patent: Aug. 20, 2024

(54) SYSTEMS AND METHODS FOR HARNESSING ENERGY FROM WIND

(71) Applicant: Introfoc Ltd, Nicosia (CY)

(72) Inventors: Panayiotis Philimis, Nicosia (CY); Varnis Charalambous, Nicosia (CY); Dimitrios Kouloumis, Nicosia (CY); Harry Georgiou, Nicosia (CY); Nicos Raftis, Nicosia (CY); Stavros Hadjiyiannis, Nicosia (CY)

(73) Assignee: Introfoc Ltd, Nicosia (CY)

( * ) Notice: Subject to any disclaimer, the term of this patent is extended or adjusted under 35 U.S.C. 154(b) by 60 days.

(21) Appl. No.: 17/791,459

(22) PCT Filed: Jan. 11, 2021

(86) PCT No.: PCT/EP2021/050357
§ 371 (c)(1),
(2) Date: Jul. 7, 2022

(87) PCT Pub. No.: WO2021/140243
PCT Pub. Date: Jul. 15, 2021

(65) Prior Publication Data
US 2023/0053124 A1   Feb. 16, 2023

(30) Foreign Application Priority Data

Jan. 8, 2020 (GB) .................................. 2000212

(51) Int. Cl.
*F03D 3/04* (2006.01)
*F03D 7/06* (2006.01)

(52) U.S. Cl.
CPC ......... *F03D 3/0427* (2013.01); *F03D 3/0418* (2013.01); *F03D 7/06* (2013.01)

(58) Field of Classification Search
CPC ......... F03D 3/0427; F03D 3/0418; F03D 7/06
See application file for complete search history.

(56) References Cited

U.S. PATENT DOCUMENTS

| | | | | |
|---|---|---|---|---|
| 570,123 | A | * | 10/1896 | Clinton ...................... F03B 3/00 |
| | | | | 415/164 |
| 1,922,866 | A | * | 8/1933 | Rosenberg ............ B64C 27/021 |
| | | | | 416/88 |
| 3,249,160 | A | * | 5/1966 | Messerschmitt ........ B64C 27/46 |
| | | | | 416/88 |

(Continued)

FOREIGN PATENT DOCUMENTS

| | | |
|---|---|---|
| CA | 2645296 A1 | 5/2010 |
| JP | 2002276532 A | 9/2002 |

(Continued)

*Primary Examiner* — Pedro J Cuevas
(74) *Attorney, Agent, or Firm* — GableGotwals

(57) ABSTRACT

A system and method for improving efficiency of vertical axis wind turbines for all wind directions, comprising an inlet convergent section, a wind turbine section adjacent to exit of convergent section and an outlet divergent section. The system provides an air passage through the inlet section, the wind turbine and the outlet section, and allows for variation of the inlet and outlet depending on wind direction, in order to maximize efficiency harnessed within a time interval in accordance to wind direction and wind speed.

18 Claims, 14 Drawing Sheets

(56) References Cited

U.S. PATENT DOCUMENTS

| | | | | |
|---|---|---|---|---|
| 3,666,210 | A * | 5/1972 | Look | B64C 3/56 244/218 |
| 4,710,101 | A * | 12/1987 | Jamieson | F03D 7/0252 416/169 R |
| 4,834,610 | A * | 5/1989 | Bond, III | F03D 7/06 415/53.3 |
| 5,203,520 | A * | 4/1993 | Przygodzki | B64C 37/00 244/17.19 |
| 5,375,968 | A * | 12/1994 | Kollitz | F03D 80/70 415/4.2 |
| 6,740,989 | B2 * | 5/2004 | Rowe | F03D 80/70 415/4.4 |
| 6,902,370 | B2 * | 6/2005 | Dawson | F03D 7/0236 416/DIG. 4 |
| 7,242,108 | B1 * | 7/2007 | Dablo | F03D 9/12 415/4.4 |
| 7,581,926 | B1 * | 9/2009 | Dehlsen | F03D 7/0236 416/37 |
| 7,582,977 | B1 * | 9/2009 | Dehlsen | F03B 17/061 290/1 R |
| 7,946,802 | B1 * | 5/2011 | Iskrenovic | F03D 3/067 415/909 |
| 8,186,960 | B2 * | 5/2012 | Dawson | B23P 6/00 416/62 |
| 8,192,161 | B2 * | 6/2012 | Baker | F03D 1/0641 416/23 |
| 8,206,107 | B2 * | 6/2012 | Dawson | F03D 7/0236 416/223 R |
| 8,231,347 | B2 * | 7/2012 | Dawson | F03D 1/0675 416/211 |
| 8,232,664 | B2 * | 7/2012 | Stroup | F03D 15/10 290/55 |
| 8,267,654 | B2 * | 9/2012 | van Dam | F03D 1/0675 416/41 |
| 8,362,631 | B2 * | 1/2013 | Roe | F03B 17/066 290/43 |
| 9,206,573 | B2 * | 12/2015 | Lin | F03B 13/264 |
| 9,745,960 | B2 * | 8/2017 | Dietzel | F03D 80/00 |
| 9,835,133 | B2 * | 12/2017 | Al-Garni | F03D 3/005 |
| 10,598,153 | B2 * | 3/2020 | Dietzel | F03D 9/12 |
| 10,669,935 | B2 * | 6/2020 | Kayara | F02C 7/04 |
| 10,844,837 | B2 * | 11/2020 | Baker | F03D 1/0641 |
| 11,078,840 | B2 * | 8/2021 | Kayara | F02C 7/057 |
| 11,098,645 | B2 * | 8/2021 | Kayara | F02C 7/057 |
| 11,215,165 | B2 * | 1/2022 | Mizerit | F03D 9/39 |
| 11,448,189 | B2 * | 9/2022 | Dietzel | F03D 9/32 |
| 2003/0122380 | A1 | 7/2003 | Harbison | |
| 2003/0133782 | A1 | 7/2003 | Holter et al. | |
| 2003/0223868 | A1 * | 12/2003 | Dawson | F03D 7/0236 416/1 |
| 2007/0013196 | A1 | 1/2007 | Chen | |
| 2009/0284016 | A1 * | 11/2009 | van Dam | F03D 1/0675 416/41 |
| 2009/0285682 | A1 * | 11/2009 | Baker | F03D 7/022 416/1 |
| 2009/0304507 | A1 * | 12/2009 | Dehlsen | F03D 7/0236 416/87 |
| 2010/0045039 | A1 * | 2/2010 | Stroup | H02P 9/04 290/55 |
| 2010/0158661 | A1 * | 6/2010 | Dawson | F03D 1/0658 290/55 |
| 2010/0260603 | A1 * | 10/2010 | Dawson | F03D 1/0675 416/146 R |
| 2010/0310374 | A1 * | 12/2010 | Dehlsen | F03D 7/0232 416/87 |
| 2012/0003077 | A1 * | 1/2012 | Churchill | F03D 80/00 415/220 |
| 2012/0230827 | A1 * | 9/2012 | Dawson | F03D 1/0658 29/889.1 |
| 2012/0263601 | A1 * | 10/2012 | Baker | F03D 1/0675 416/223 R |
| 2015/0240786 | A1 * | 8/2015 | Dietzel | F03D 15/10 290/44 |
| 2017/0342963 | A1 * | 11/2017 | Dietzel | F03D 9/12 |
| 2019/0257281 | A1 | 8/2019 | Raina | |
| 2020/0200147 | A1 * | 6/2020 | Dietzel | B63H 20/007 |
| 2021/0123412 | A1 * | 4/2021 | Fierros Palacios | F03D 3/02 |

FOREIGN PATENT DOCUMENTS

| | | | | |
|---|---|---|---|---|
| WO | WO-2010060192 | A1 * | 6/2010 | F03B 17/061 |
| WO | WO-2012016263 | A2 * | 2/2012 | F03D 3/002 |

\* cited by examiner

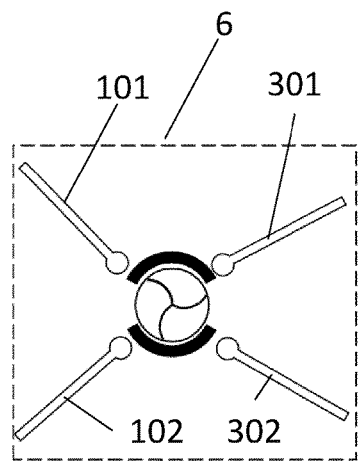 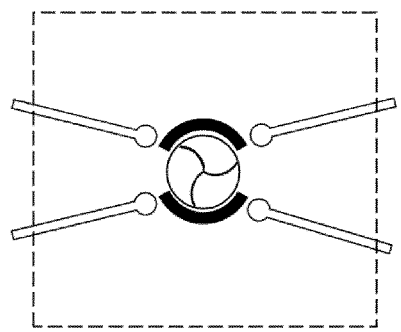 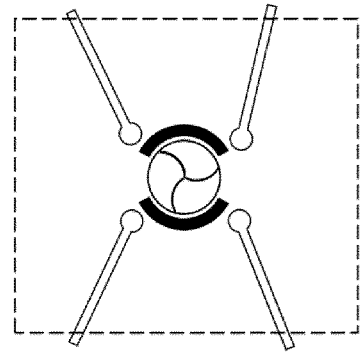
Fig. 7a1      Fig. 7b1      Fig. 7c1
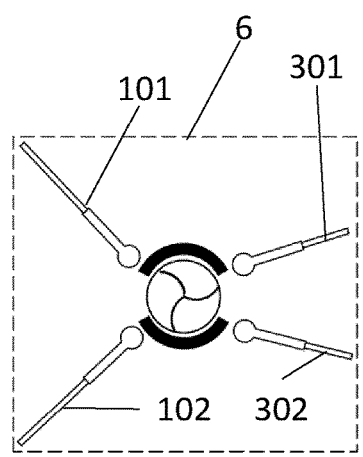 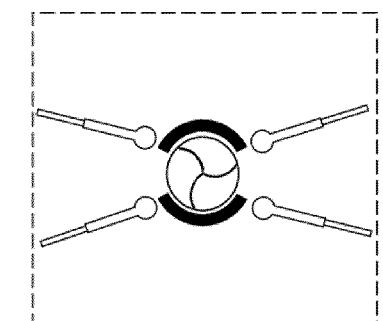 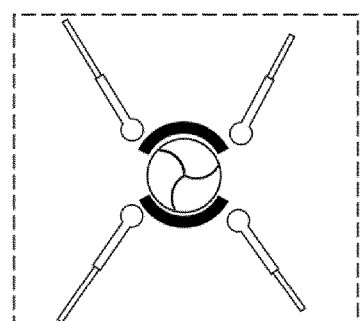
Fig. 7a2      Fig. 7b2      Fig. 7c2

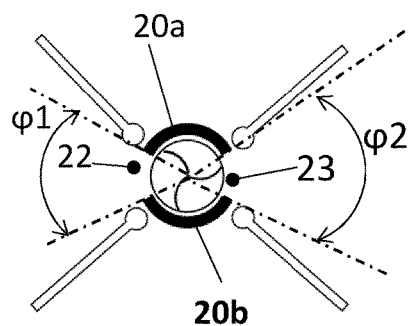
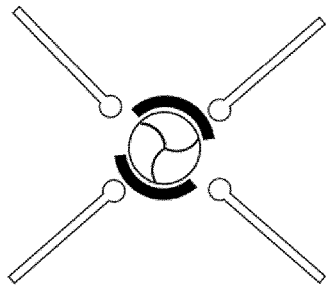
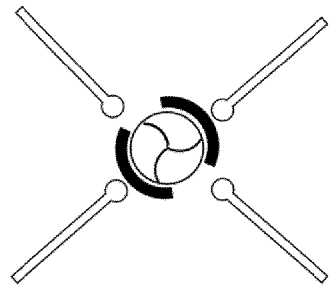
Fig. 8a1　　　　　　Fig. 8b1　　　　　　Fig. 8c1
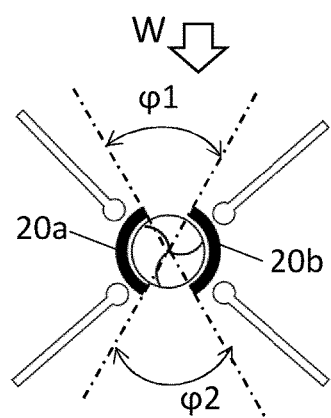
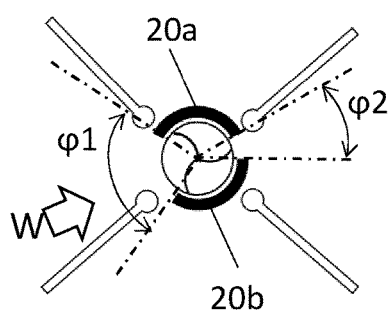
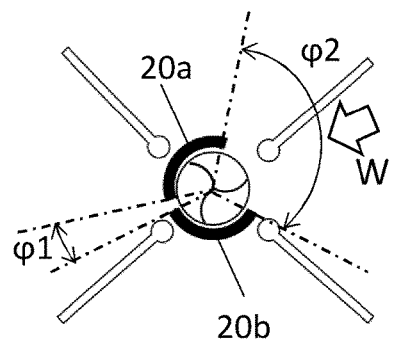
Fig. 8a2　　　　　　Fig. 8b2　　　　　　Fig. 8c2

SYSTEMS AND METHODS FOR HARNESSING ENERGY FROM WIND

CROSS-REFERENCE TO RELATED APPLICATIONS

This United States application is the National Phase of PCT Application No. PCT/EP2021/050357 filed 11 Jan. 2021, which claims priority to British Patent Application No. 2000212.7 filed 8 Jan. 2020, each of which is incorporated herein by reference.

TECHNICAL FIELD

The present disclosure relates to a system for harnessing or generating energy from wind. The system may be particularly for improving efficiency of vertical axis wind turbines for all wind directions. The present disclosure further provides a method of operating such a system.

BACKGROUND

One important area of renewable energy exploitation is harnessing of wind power in urban environments. One way to do this is to install wind turbines on roofs of buildings. In an urban environment the turbine itself is typically limited in size, and this requires that system installations can capture the greatest possible volume of wind and direct it and accelerate it towards the turbine to achieve the greatest possible energy generation efficiency. In an urban environment wind speeds often change quickly, and thus being able to capture wind from different directions is critical for overall system performance throughout the 24-hour day and throughout the 365 days of the year. An urban environment also requires that an installation is not too noisy, can be installed easily within the size limitations imposed by different town planning regulations, and is inconspicuous.

There are several known disclosures and apparatuses relating to wind acceleration, for wind turbines, using convergent or divergent sections or both. There are several patents that seek to improve performance of wind turbines in an urban environment by capturing and accelerating wind flow. Generally, such devices include a convergent chamber for air inlet, a chamber that houses a wind turbine, and a diffusing chamber. Existing patents focus on improving laminar flow, increasing the pressure differential from inlet and outlet, obtaining maximum wind acceleration.

U.S. Pat. No. 9,249,807B2 refers to a fluidic flow capture and acceleration apparatus for use in building roofs and focuses on delivering laminar flow to the turbine by using streamliners. This apparatus is limited to a small range of wind directions that are in alignment to the primary axis of the focusing, constricting, and diffusing chambers.

U.S. Pat. No. 6,638,005B2 discloses a rotatable turbine housing having an air inlet opening and an air outlet opening. Although a rotatable turbine housing can respond to changing wind directions, it is inevitably a heavy and bulky structure that may not be suitable for installation on roofs of buildings.

U.S. Pat. No. 9,593,666B2 discloses a turbine housing assembly comprising an enclosure that defines an interior space with openings through which air can flow into the enclosure in a horizontal direction and is then directed in a direction perpendicular to the direction of the airflow. The disclosed system is bulky and would be difficult, in most cases, to install on roofs of urban buildings due to height limitations imposed by town planning regulations. In addition, this system cannot adjust to changing wind direction in the horizontal plane as per typical wind rose.

US20130136576A1 describes a system having an inlet portion comprising vane so that the channel at the inlet portion is divided into a number of flow paths leading towards the wind turbine to focus the air pressure in front of the wind turbine to improve the effect of the air velocity on the wind turbine. This system may be able to provide some improved performance when the wind direction is essentially aligned with the primary axis through the inlet portion, but it does nothing to assist performance when the wind direction changes and is out of alignment with the primary axis through the inlet portion.

U.S. Pat. No. 8,821,117B2 also discloses a system with a convergent section for an air inlet, a section housing the turbine, and a divergent section at an exit and focuses on the ratios of these sections for optimal performance. There is no means of dealing with changing wind direction.

EP2013174534 discloses a wind power module for building rooftops, typically placed at the edge of a roof to take advantage of upstream air flow. Thus, the inflow area is oriented to capture air moving upwards from the side of a building. This system cannot accommodate change of wind direction in the horizontal plane.

DE10331682A1 discloses a system having at the flow inlet at least one guide fin, which, together with the upstream guide surface, delimits a flow channel that tapers towards its mouth and accelerates the flow. The use of guide fins can be helpful in conditioning the air flow at inlet and make the system less sensitive to small variations of the wind direction as long as it is essentially aligned with the primary axis of the system. When the wind direction changes significantly then these systems cannot accommodate the change in wind direction and performance can drop significantly.

A number of patents disclose systems that are intended for mounting on rooftops, but for these systems the entire structure is rotating. For example, US20100032954A1 describes a system comprising two counter-rotating rotors. The rotors are mounted between two opposing aerofoils; the aerofoils and the rotors together being mounted on a turntable. The fact that the entire turntable rotates means that only small turbines (rotors) can be used with such system and hence overall energy yield is small.

U.S. Pat. No. 8,232,664 discloses a turbine surrounded by a structure comprising diverter doors (panels) for controlling the air impinging on the turbine blades. Theses diverter doors are closable in high wind conditions to seal off the wind turbine to protect the turbine against damage. The turbine is aimed at protecting the turbine in conditions of high wind. The structure with open doors at all sides does not allow concentration of air flow.

Other patents describe static structures that surround a turbine, and which static structures are open at all sides. For example, KR102026980B1 describes a support frame that includes a wind collection plate to collect the wind toward the turbine. This however, being open on all sides, does not provide sufficient flow acceleration and performance increase is small. U.S. Pat. Nos. 5,852,331 and 9,951,628 also utilize static structures open at all sides, having a plurality of curved vanes in the form of a spiral.

SUMMARY

The prior art does not sufficiently address system efficiency at different wind directions. There is therefore the need for a system that can provide enhanced efficiency in harvesting the energy of the wind over a long period of time by adapting to the changing conditions of wind speed and wind direction. This system must be compatible to the constraints that are found for installations on top of buildings in relation to height, space, safety and aesthetics.

An objective of this disclosure is to provide an enhanced and enclosed wind capturing apparatus for building rooftops, capable of capturing and accelerating wind flows and maximising the energy harvested, at all conditions, without having to rotate the complete apparatus.

The present invention therefore provides a system and method in accordance with the claims.

The present disclosure also provides a system comprising: a convergent section; a wind turbine section adjacent to an exit of said convergent section, said wind turbine section comprising at least one wind turbine; a divergent section adjacent to an exit of said wind turbine section, wherein at least one of the convergent section and the divergent section comprises side panels, characterised in that: at least two of said side panels are modifiable in use, such as for harnessing energy, such as in accordance with wind direction and/or wind speed; and said wind turbine section comprises a turbine-surrounding structure that at least partially surrounds said at least one wind turbine, said turbine-surrounding structure comprising openings for wind to pass from the convergent section, through the turbine section and to the divergent section, wherein said turbine-surrounding structure is adjustable in use, such as in accordance with wind direction and/or wind speed.

The present disclosure also provides a method of operating a system comprising: a convergent section; a wind turbine section comprising at least one wind turbine; a divergent section; wherein at least one of the convergent section and the divergent section comprises side panels, further wherein the wind turbine section comprises a turbine-surrounding structure that at least partially surrounds said at least one wind turbine and comprising openings for wind to pass from the convergent section, through the turbine section and to the divergent section, wherein the method comprises operating the system by: modifying at least two of the side panels, such as for maximising the amount of energy harnessed within a time interval in accordance with wind direction and/or wind speed; and adjusting the turbine-surrounding structure, such as in accordance with wind direction and/or wind speed.

The disclosure refers to a system for improving efficiency of vertical axis wind turbines. One of the advantages of vertical axis wind turbines is that they can capture wind from all directions. However, when the turbine is surrounded by an enclosure or fins for accelerating air flow to improve efficiency, it generally suffers in that the turbine can no longer capture wind from all directions. This disclosure focuses on providing a surrounding structure to a turbine that can accelerate air flow and improve turbine efficiency while at the same time being able to adapt to changing wind directions so that efficiency of a vertical axis turbine can be improved while maintaining its omnidirectional characteristic. The disclosure is suitable for installations at the roof of buildings.

The system captures and accelerates wind towards a turbine, and is capable of adjusting its geometry and configuration to maintain good performance for different wind speeds and wind directions.

The present disclosure relates to a system that can adapt to changing wind speed and direction, in order to maximise the energy harvested by a wind turbine; this wind turbine is placed inside an enclosure, having an inlet convergent section to capture and accelerate the wind and an outlet divergent section. The geometry of the enclosure can adapt to achieve the geometry that will yield the best performance in harvesting the energy of the wind. The system is designed to work well in an urban environment and specifically on rooftops, having to comply with all the constraints of having such a system on building rooftops.

The system may be for maximising the energy harnessed from the wind. The system may be for use with at least one wind turbine and may be aimed at increasing the air velocity contacting said wind turbine.

Modifying at least two of the side panels may comprise adjusting an opening angle between at least two side panels of the convergent section and/or at least two side panels of the divergent section. Modifying at least two of the side panels may alternatively or additionally comprise extending or retracting the side panels to adjust their length, which may be their dimension in a direction away from a rotational axis of the at least one wind turbine. The side panels may each be rotatable about a pivot. A pivot axis of each pivot may be parallel to the rotational axis of the at least one wind turbine.

The turbine-surrounding structure may be adjustable in use by being rotatable in use, such as by being rotatable around the at least one wind turbine such as around the outer circumference thereof. The turbine-surrounding structure may be adjustable in use by (a) the openings being adjustable in position or orientation relative to the wind turbine and/or convergent and divergent sections and/or (b) the size of the openings being adjustable.

The present disclosure provides a system for maximising the energy harnessed from the wind, for use with at least one wind turbine and aimed at increasing the air velocity contacting said wind turbine, said apparatus comprising: a convergent section, said convergent section comprising an entry and an exit, said entry having an area higher than said exit, said convergent section having a first ratio being the entry area over the exit area; a wind turbine section adjacent to said exit of said convergent section, said wind turbine section comprising said at least one wind turbine; a divergent section adjacent to said wind turbine section, said divergent section comprising an entry and an exit, said entry having an area lower than said exit, wherein at least one of the convergent section and the divergent section comprises a cross-section having four sides, each of said four sides comprising side panels, characterised in that: at least two or more of said side panels can be modified in order to maximise the amount of energy harnessed within a time interval in accordance to wind direction and wind speed, and further characterised in that said wind turbine section comprising turbine-surrounding structure that surrounds said wind turbine, said turbine-surrounding structure having openings for wind to pass from the convergent section, through the turbine section, and exit to the divergent section.

BRIEF DESCRIPTION OF DRAWINGS

By way of example only, embodiments of systems and methods of the present disclosure are now described with reference to, and as shown in, the accompanying drawings, in which:

FIGS. 6a to 6d illustrate the improvement in the capture efficiency at angled winds.

FIGS. 7a1 to 7c1 illustrate schematically an example of the changing geometry of the system as side panels rotate, without change in their length and, in doing so, move beyond a virtual rectangular envelope.

FIGS. 7a2 to 7c2 illustrate schematically an example of the changing geometry of the system as side panels change in length (extend or retract) as they rotate in order to stay within a rectangular envelope.

FIGS. 8a1 to 8c1 illustrate schematically an example of the changing geometry of the system as the two members comprising the turbine-surrounding structure rotate while maintaining a fixed relative position of one relative to the other.

FIGS. 8a2 to 8c2 illustrate schematically an example of the changing geometry of the system as the two members comprising the turbine-surrounding structure rotate while also changing the relative position of one relative to the other.

FIGS. 10a to 10e illustrate the change in profile to affect the external flow.

DETAILED DESCRIPTION

Figure 1:
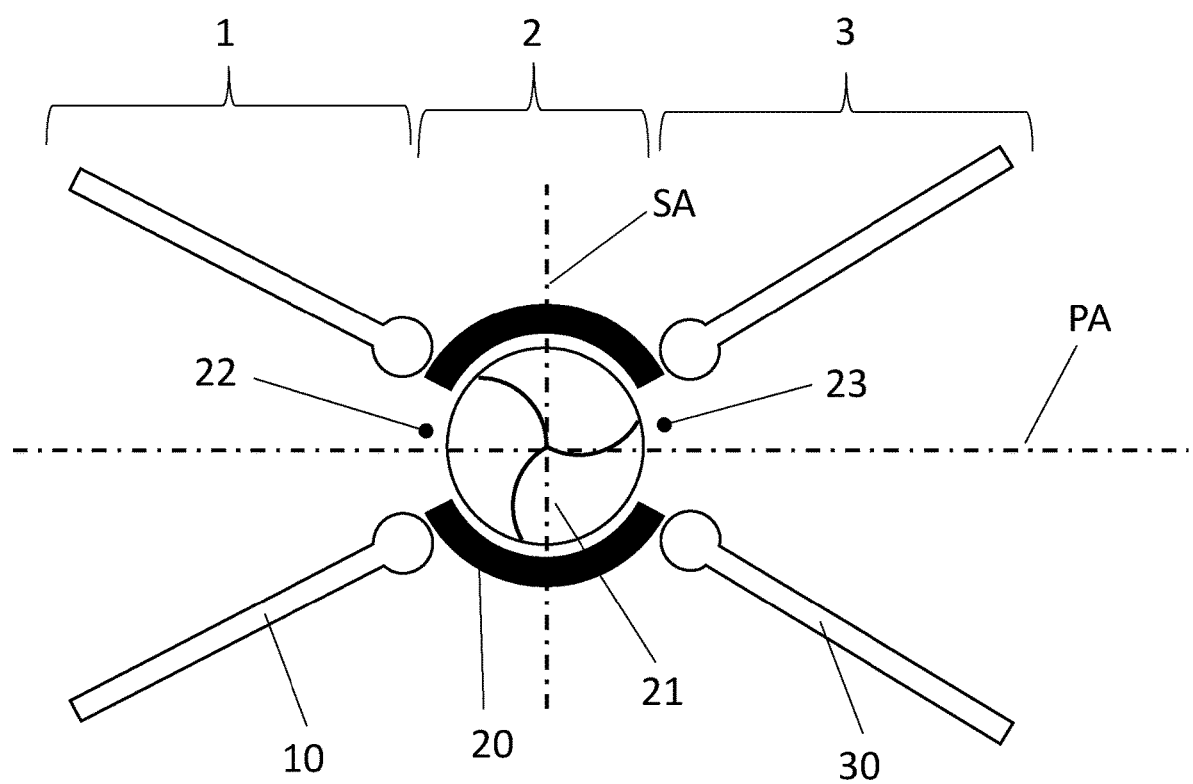
FIG. 1 illustrates a schematic of the system showing its basic elements.

A core benefit of this disclosure is the ability of the system to adapt to changing wind conditions in order to maximise to total energy harvested over a period of time. The disclosure comprises a system or apparatus having three main sections as illustrated schematically in FIG. 1: a convergent section 1, a wind turbine section 2 and a divergent section 3. The convergent section 1 comprises an entry and an exit, said entry having an area higher than said exit. The convergent section 1 has a first ratio being the entry area over the exit area. The first ratio of the entry area over the exit area is greater than 1.

The wind turbine section 2 is adjacent to the exit of the convergent section 1, and the wind turbine section 2 comprises at least one wind turbine 21. The at least one wind turbine 21 may rotate about a rotational axis, which may be aligned substantially vertically. In a preferred embodiment the wind turbine 21 is a vertical axis turbine. In one embodiment, the vertical axis turbine is a Gorlov type turbine. The at least one wind turbine 21 may be mounted to a generator or the like for using the energy captured from the wind by the at least one wind turbine 21 and generating electricity. The at least one wind turbine 21 may capture energy from the wind by being operable to rotate when wind passes through the at least one wind turbine 21. The generator may convert the kinetic energy from rotation of the at least one wind turbine 21 into electrical energy. The term "in use" as used herein may refer to the operation of the system when the wind turbine 21 is rotating about its rotational axis and providing power for a generator.

The divergent section 3, adjacent to the wind turbine section 2, also comprises an entry and an exit, the entry having an area lower than said exit. The entry of the divergent section 3 may be adjacent the wind turbine section 2. At least one of the convergent section 1 and the divergent section 3 comprises side panels 10, 30 extending away from the wind turbine section 2. In particular, at least one of the convergent section 1 and the divergent section 3 comprises a cross-section having four sides, each of said four sides comprising side panels 10, 30. At least two of these side panels 10, 30 can be modified in order to maximise the amount of energy harnessed within a time interval in accordance to wind direction and wind speed. Each of the convergent section 1 and divergent section 3 may comprise at least one side panel 10, 30 and may comprise two side panels 10, 30 defining said convergent section 1 and divergent section 3. At least one side panel 10, 30 of each of the convergent section 1 and divergent section 3 may be modifiable in use, such as for maximising the amount of energy harnessed within a time interval in accordance with wind direction and/or wind speed.

The side panels 10, 30 may extend along a height substantially parallel to the rotational axis of the at least one wind turbine 21 and along a length in a direction perpendicular to and away from the rotational axis of the at least one wind turbine 21. The side panels 10, 30 may extend upstream and/or downstream of the at least one wind turbine 21 in a direction perpendicular to the rotational axis of the at least one wind turbine 21. The side panels 10, 30 may extend substantially along at least 50% or at least 75% or all of the height of the wind turbine 21.

In one preferred embodiment, the modification of these side panels 10, 30 comprises rotation or extension in length of the side panels 10, 30 or a combination of extension and rotation. In other embodiments the modification comprises other changes of shape of the side panels 10, 30. The side panels 10, 30 may rotate about fixed pivot points.

Another core characteristic of the disclosure is that the wind turbine section 2 comprises a central turbine-surrounding or enclosing structure 20 that surrounds or at least partially surrounds the wind turbine 21. This turbine-surrounding structure 20 has openings 22, 23 for wind to pass from the convergent section 1, through the wind turbine section 2, and exit to the divergent section 3. The pivot points of the side panels 10, 30 maybe adjacent to the turbine-surrounding structure 20.

The turbine-surrounding structure 20 may comprise two openings 22, 23, each arranged on substantially opposing sides of the rotational axis of the at least one wind turbine 21. Wind may be directed from the convergent section 1, through a first opening 22 of the turbine-surrounding structure 20, through the at least wind turbine 21, through a second opening 23 of the turbine-surrounding structure 20 and subsequently though the divergent section 3.

The turbine-surrounding structure 20 may be mounted between the at least one wind turbine 21 and the side panels 10, 30. The turbine-surrounding structure 20 may be located downstream of side panels 10, 30 of the convergent section 1 and may be located between the side panels 10, 30 of the convergent section 1 and the at least one wind turbine 21. The turbine-surrounding structure 20 may be located upstream of side panels 10, 30 of the divergent section 3 and may be located between the side panels 10, 30 of the divergent section 3 and the at least one wind turbine 21. In an embodiment wind from the convergent section 1 must pass through at least one opening 22 to enter the at least one wind turbine 21 and/or wind exiting the at least one wind turbine 21 must pass through at least one opening 23 to reach the divergent section 3.

The turbine-surrounding structure 20 may surround the at least one wind turbine 21 other than at the openings 22, 23 and may extend substantially around the circumference of the at least one wind turbine 21 other than at the openings 22, 23. The turbine-surrounding structure 20 may extend substantially along at least 50% or at least 75% or all of the height of the at least one wind turbine 21, the height being the length of the at least one wind turbine 21 along its rotational axis. The openings 22, 23 may extend along at least 50% or at least 75% or all of the height of the turbine-surrounding structure 20 and/or at least one wind turbine 21.

The system may be thought of as having a primary axis PA and a secondary axis SA as shown in FIG. 1. The primary axis PA may define the primary orientation of the system and the air flow direction from the convergent section 1, through the wind turbine section 2, to the divergent section 3 when the turbine-surrounding structure 20 has its openings 22, 23 aligned to the primary axis PA. The secondary axis SA is essentially perpendicular to the primary axis PA. The primary and secondary axes PA, SA, may be in a plane perpendicular to the rotational axis of the wind turbine 21.

Figure 2A:
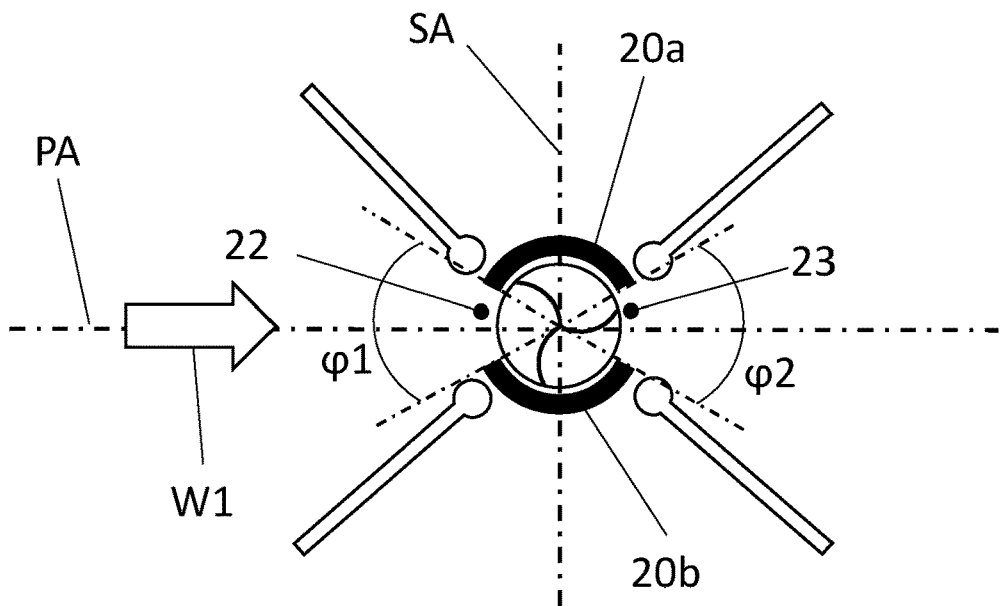
FIGS. 2a and 2b illustrate a schematic of the system showing a movement of the turbine-surrounding structure that surrounds the turbine from one position to another position at 90 degrees' rotation to accommodate change of wind direction.
Figure 2B:
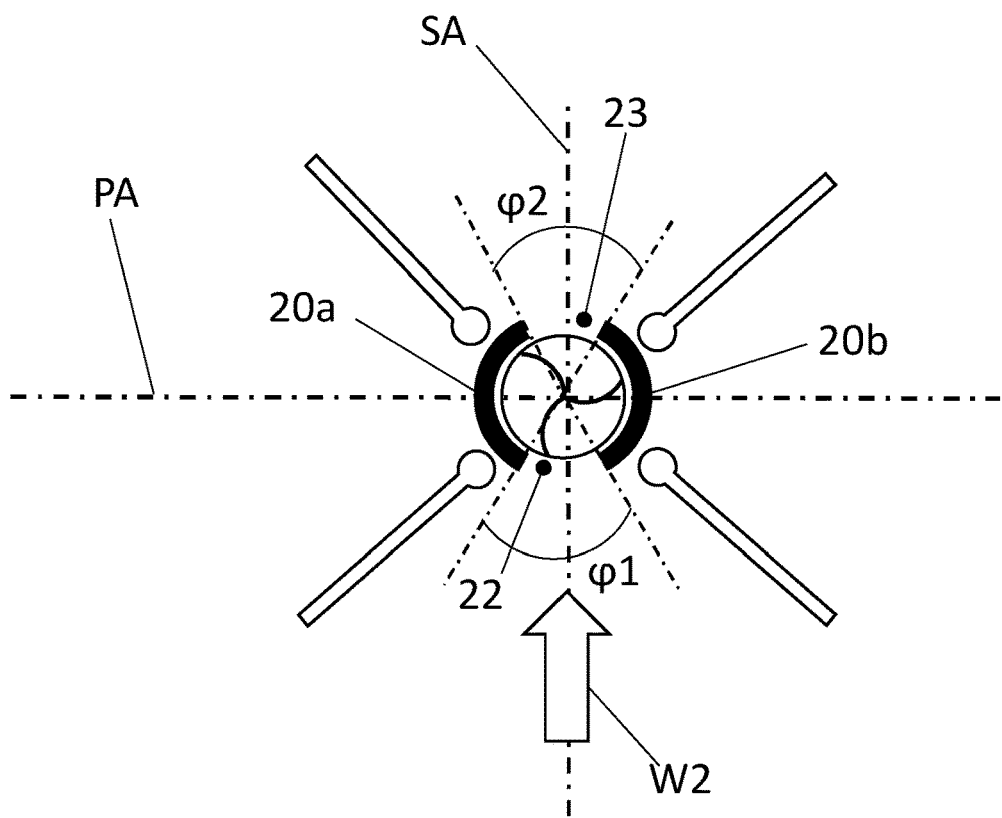
Figure 3A:
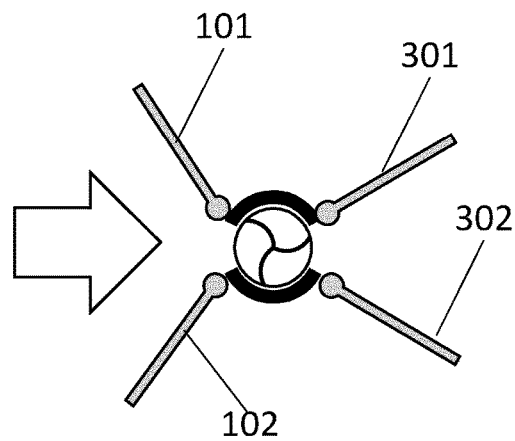
FIGS. 3a to 3e illustrate schematically an example of the changing geometry of the system as side panels can rotate to accommodate different wind directions.
Figure 3B:
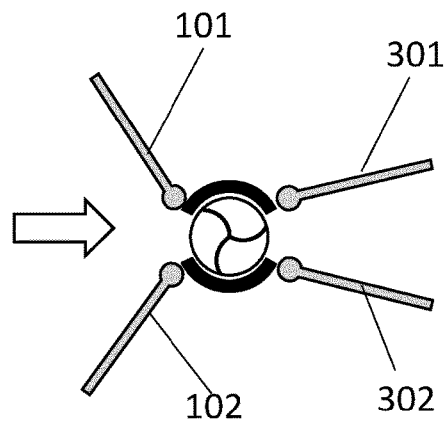
Figure 3C:
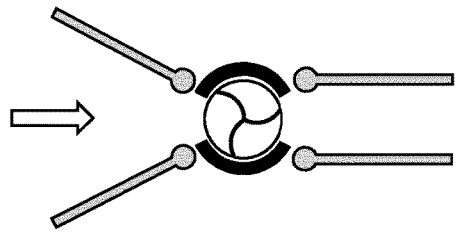
Figure 3D:
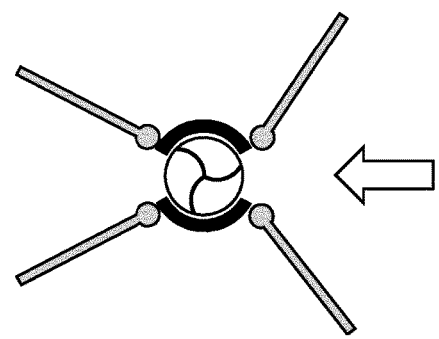
Figure 3E:
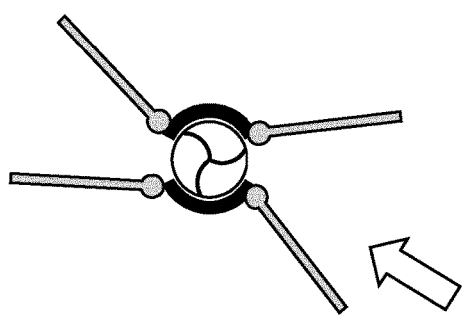
Figure 3F:
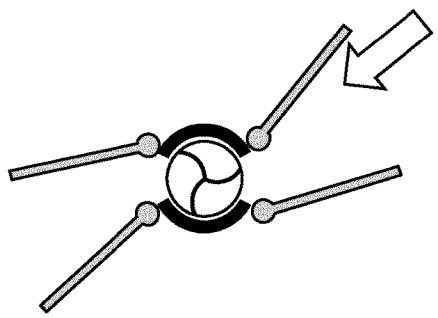

The orientation of the turbine-surrounding structure 20 is adjustable for accommodating changes in wind direction and/or wind speed. The turbine-surrounding structure 20 may be rotatable for alignment of the openings 22, 23 with the wind direction. FIGS. 2a and 2b illustrate a schematic of the system showing a movement, adjustment or rotation of the turbine-surrounding structure 20 that at least partially surrounds the wind turbine 21 from one position to another position at 90 degrees' rotation to accommodate change of wind direction. In one embodiment the side panels 10, 30 of the convergent section 1 or the divergent section 3 may be stationery, and only the turbine-surrounding structure 20 may be rotating.

As shown in FIGS. 2a and 2b, the turbine-surrounding structure 20 may comprise at least two walls 20a, 20b. The at least two walls 20a, 20b of turbine-surrounding structure 20 are separated by a first opening 22 and a second opening 23. The at least two walls 20a, 20b may extend substantially circumferentially around the at least one wind turbine 21 and may extend along a height parallel to the rotational axis of the at least one wind turbine 21. Each wall 20a, 20b may be formed as a partial tubular wall.

The size or width of the first and second openings 22, 23 may be defined by angles φ1 and φ2 respectively. Angles φ1 and φ2 are measured about the rotational axis of the at least one wind turbine 21 and are between the edges of the first and second openings 22, 23. In one embodiment the at least two walls 20a, 20b of turbine-surrounding structure 20 are configured, such as by being part of a single structure or being linked together, so that the first opening 22 and second opening 23 are fixed so that the angles φ1 and φ2 remain constant. The turbine-surrounding structure 20 with its at least two walls 20a, 20b may rotate as the wind direction changes from direction W1 to direction W2.

Generally, and as shown by example in FIGS. 2a and 2b, a change in wind direction of 90 degrees (for example about the rotational axis) may require a corresponding rotation of the turbine-surrounding structure 20. In some cases, a change of wind direction by more than 45 degrees may also render the rotation of the turbine-surrounding structure 20 a required system response. Initially the inlet opening 22 may be aligned with the primary axis PA (for example along wind direction W1 in FIG. 2a). Upon a rotation of 90 degrees of the turbine-surrounding structure 20, the inlet opening 22 of the system is aligned with the secondary axis SA of the system rather than the primary axis of the system PA. The turbine-surrounding structure 20 may be rotatable by at least 90 degrees about the rotational axis of the at least one wind turbine 21 and may be fully rotatable around 360 degrees. The turbine-surrounding structure 20 may be supported on rails and may be able to rotate at least 90 degrees about a centre axis of said turbine-surrounding structure 20 or a rotational axis of the at least one wind turbine 21.

When the wind speed changes, the system may adapt by changing the opening of the side panels 101, 102 at the convergent section 1 which acts as the air inlet and/or the opening of the side panels 301, 302 at the divergent section 3 which acts as the air outlet. FIGS. 3a to 3f show by means of example alternative configurations that the side panels 101, 102, 301, 302 can take as wind changes speed and direction, and the system adapts to the changing wind conditions to optimize performance. Performance is measured as the total energy harvested by the system over a given period of time.

Figure 4A:
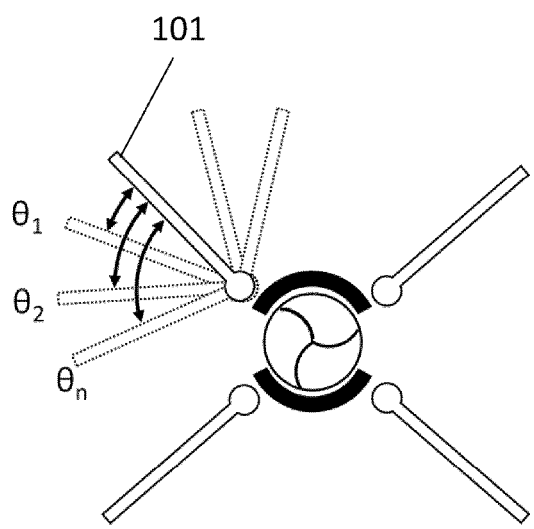
FIGS. 4a and 4b illustrate schematically an example of the changing geometry of the system as one of the side panels rotates over a range of angles.
Figure 4B:
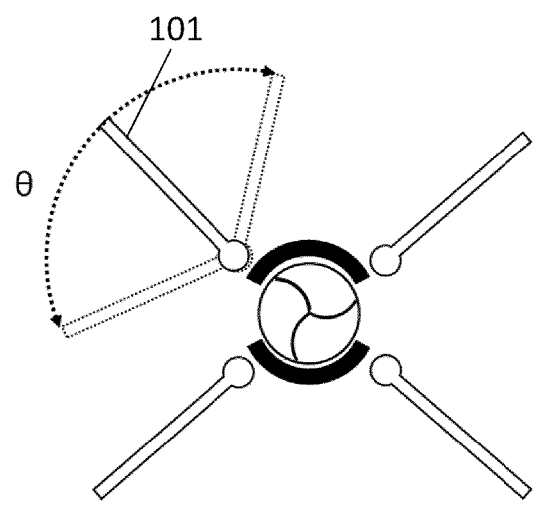

FIGS. 4a and 4b illustrate schematically an example of the changing geometry of the system as one of the side panels 101 rotates over a range of angles. By reference to one side panel 101, FIG. 4a illustrates schematically, by means of an example, a change of relative position by angle θ1, θ1, θn, with reference to an initial position. In general, any one of the four side panels 101, 102, 301, 302, can rotate over an allowable range of angles θ, as shown by means of an example with reference to a side panel 101 in FIG. 4b. The rotation may be continuous or stepwise at specific angles.

Figure 5A:
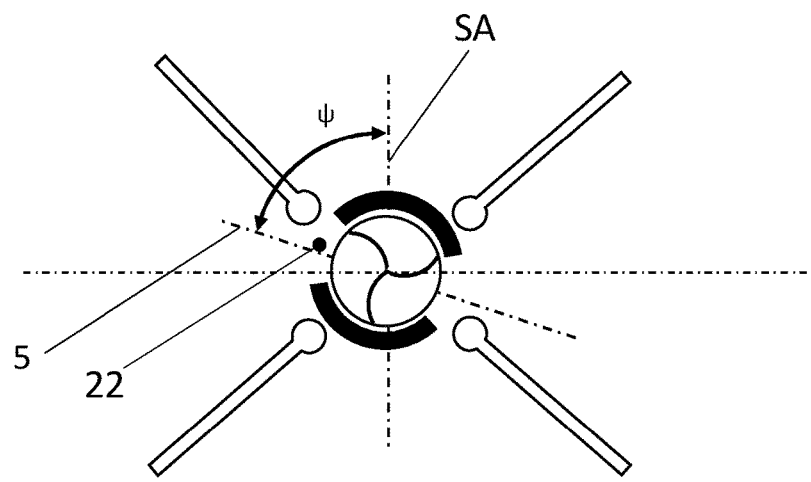
FIGS. 5a to 5d illustrate schematically an example of the changing geometry of the system as the turbine-surrounding structure rotates over a range of angles.
Figures 5B, 5C, 5D:
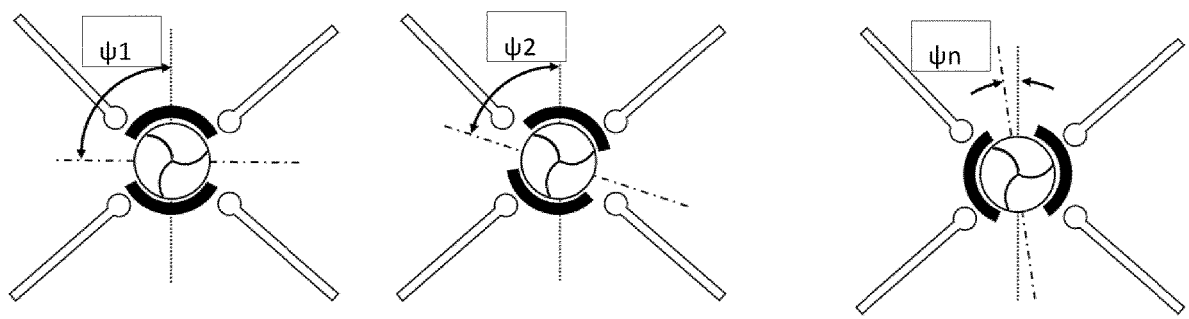

FIGS. 5a to 5d illustrate schematically an example of the changing geometry of the system as the turbine-surrounding structure 20 rotates over a range of angles. In a similar way as the side panels 101, 102, 301, 302 shown in FIGS. 3a to 3f and 4a to 4b, the turbine-surrounding structure 20 can also rotate to accommodate changing wind direction. FIG. 5a shows the rotation of the turbine-surrounding structure 20 at an angle ψ as measured between the airflow axis 5 and the secondary axis SA of the system. FIGS. 5b to 5d show the turbine-surrounding structure 20 at different rotational angles ψ1, ψ2, ψn. The rotation may be continuous or stepwise at specific angles.

Figure 6A:
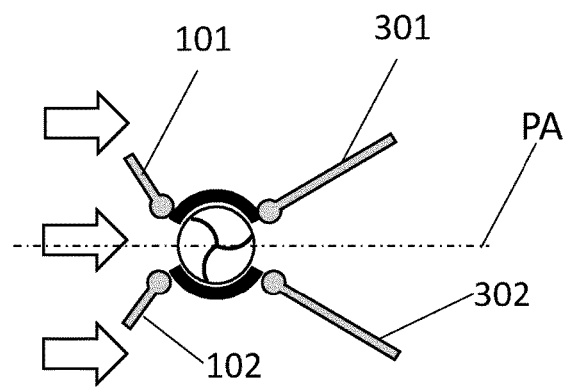
FIGS. 6a to 6d illustrate schematically an example of the changing geometry of the system as side panels rotate and change in length (extend or retract) to facilitate changing wind direction and/or wind speed.

FIGS. 6a to 6d illustrate schematically an example of the changing geometry of the system as side panels 101, 102, 301, 302 rotate and change in length (extend or retract) to facilitate changing wind direction and/or wind speed. FIG. 6a shows the side panels 101, 102 rotating or changing in length. FIG. 6a shows an example where the wind direction is aligned with the system primary axis PA and wind amplitude is high. The side panels 101, 102 of the convergent section 1 contract to reduce in length and hence reduce their wind capture area.

Figure 6B:
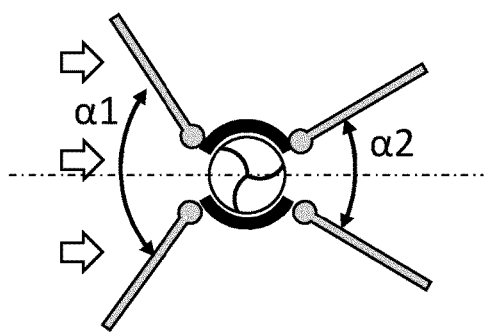

FIG. 6b shows an example where the wind direction is aligned with the system primary axis PA and wind amplitude is low. In this case the side panels 101, 102 of the convergent section 1 extend to increase in length and hence increase their wind capture area. The example shown in FIG. 6b shows side panels 101, 102 at the inlet or convergent section 1 being at one opening angle α1 and the side panels 301, 302 at the outlet or divergent section 3 being at a different opening angle α2 from the pane. The opening angle α1, α2 may be the angle between the side panels 101, 102, 301 302 about the rotational axis of the at least one wind turbine 21.

Figure 6C:
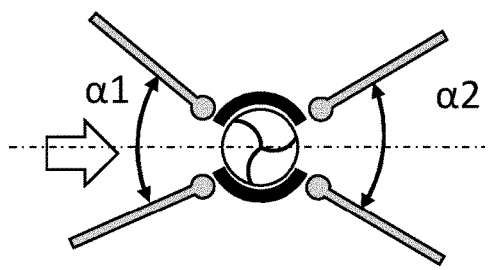

The example shown in FIG. 6c shows side panels 101, 102 at the inlet or convergent section 1 being at one opening angle α1 and the side panels 301, 302 at the outlet or divergent section 3 being at an opening angle α2 from the pane where α1=α2. The opening angles α1 and α2 are adjusted according to wind speeds and wind directions in order to create optimal conditions for the rotation of the at least one wind turbine 21 and thus harvest maximum power.

Figure 6D:
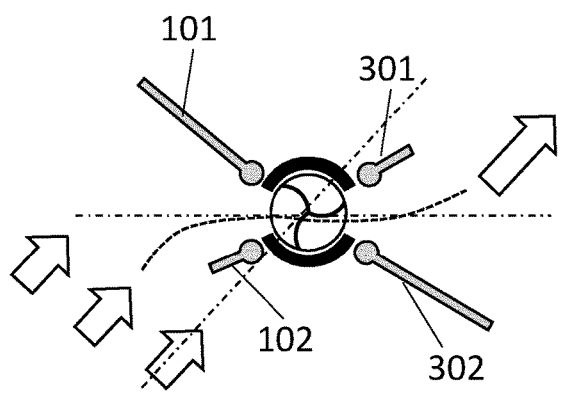

FIG. 6d shows another example where at the convergent section 1 (inlet) one side panel 101 is extended while the other side panel 102 is retracted, and similarly at the divergent section 3 (outlet) one side panel 302 is extended while the other side panel 301 is retracted to accommodate a direction of wind that is at an oblique angle to the primary system axis PA.

The length of the side panels 101, 102, 301, 302 can also be adjustable in order to keep the edge of the panels within a certain envelope 6, envelope enclosure or operational envelope. The system may be operable within the operational envelope 6 by the side panels 101, 102, 301, 302 being configured to only be extendable and/or pivotable within the operational envelope 6.

FIGS. 7a1 to 7c1 illustrate schematically an example of the changing geometry of the system as side panels 101, 102, 301, 302 rotate, without change in their length and, in doing so, the edges of the side panels 101, 102, 301, 302 move beyond a virtual rectangular envelope 6. Please note that in the illustrations, the envelope 6 is shown in a preferred embodiment as a rectangle. It may be possible in other cases to have an envelope 6 of different shape.

A virtual envelope 6 is referred to, but in preferred embodiments the envelope 6 may be a physical construction. For example, the system may comprise a housing and the housing may define an operational envelope 6 within which the side panels 101, 102, 301, 302 operate. The at least one wind turbine 21, turbine-surrounding structure 20 and side panels 101, 102, 301, 302 may be mounted in and/or to the housing. Such physical construction of an envelope 6 serves an important function regarding safety, by preventing people, animals, and birds to enter the system and reach the turbine 21 where they may get injured by the rotating turbine blades. The envelope 6 may also serve an aesthetics appearance function. FIGS. 7a2 to 7c2 illustrate schematically an example of the changing geometry of the system as side panels 101, 102, 301, 302 rotate, and at the same time retract to reduce their length so that the edge of the side panels 101, 102, 301, 302 stays within the envelope 6. If the envelope 6 is a physical structure, the angle of rotation of the side panels 101, 102, 301, 302 must be limited so that they do not interfere and impact the envelope 6.

In FIGS. 2a and 2b, the first opening 22 and second opening 23 are fixed so that the angles φ1, φ2 (i.e. between walls of the turbine-surrounding structure 20) and the size of the openings 22, 23 remain constant. This is not always the case, and in another embodiment the angles φ1, φ2 can change according to wind speed and/or direction. The turbine-surrounding structure 20 may be operable to adjust angles φ1, φ2 defining the size of the openings 22, 23 according to wind speed and/or direction.

The sequence in FIGS. 8a1 to 8c1 illustrate schematically an example of the changing geometry of the system as the two members or walls 20a, 20b of the turbine-surrounding structure 20 rotate while maintaining a fixed relative position of one relative to the other so that angles φ1, φ2 remain constant. In contrast, FIGS. 8a2 to 8c2 illustrate schematically an example of the changing geometry of the system as the two members or walls 20a, 20b of the turbine-surrounding structure 20 rotate while also changing the relative position of one relative to the other. In doing so the angles φ1, φ2 change and one increases while the other decreases. In one embodiment the members 20a, 20b are part of a single or unitary turbine-surrounding structure 20 and move together as that structure 20 rotates, as characteristically shown by means of an example in FIGS. 8a1 to 8c1. In another embodiment, the walls 20a, 20b are separate structures, actuated independently and rotate in a way that results in the angles φ1, φ2 changing as each of the walls 20a, 20b rotate, as characteristically shown by means of an example in FIGS. 8a2 to 8c2.

Figure 9A:
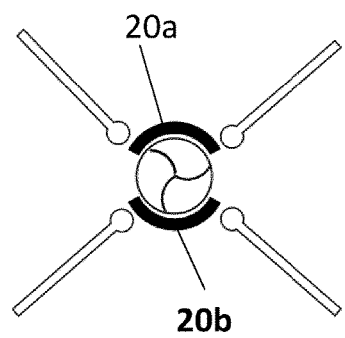
FIGS. 9a to 9c illustrate schematically examples of alternative geometries of the turbine-surrounding structure.
Figure 9B:
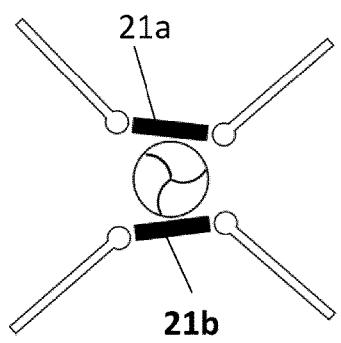
Figure 9C:
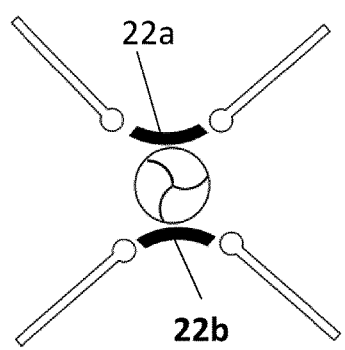

FIGS. 9a to 9c illustrate schematically examples of alternative geometries of the turbine-surrounding structure 20. The turbine-surrounding structure 20 that surrounds the turbine 21 and its two walls 20a, 20b may have a concave shape (as seen from the turbine 21 side), may have a flat shape 21a, 21b and/or may have a convex shape 22a, 22b. The shape of the turbine-surrounding structure 20 is dependent on the type of turbine 21 itself and on the geometry of the walls 20a, 20b, 21a, 21b, 22a, 22b of the convergent and divergent sections 1, 3 and the side panels 101, 102, 301, 302 that they comprise of.

Figure 10A:
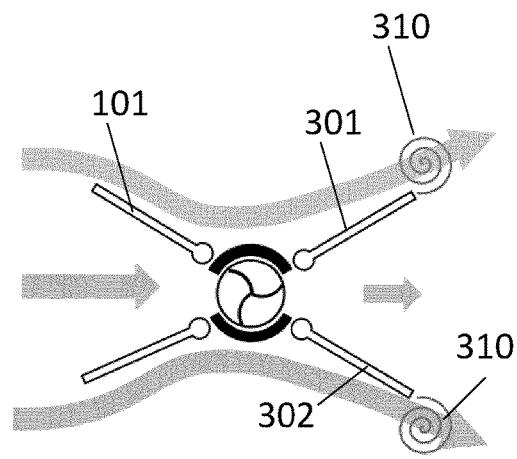
FIGS. 10a and 10b illustrate schematically an example of the effect of the geometry of the side panels, in this example side panels at the downstream direction.
Figure 10B:
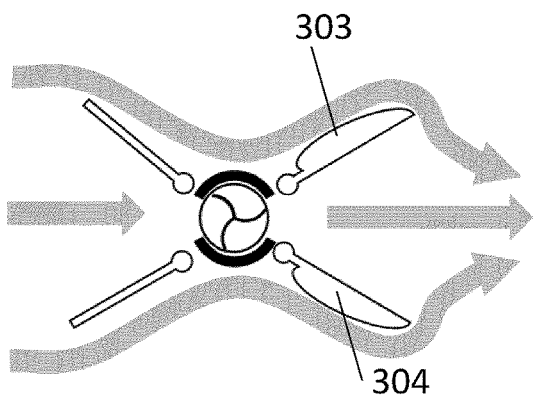

FIGS. 10a and 10b illustrate schematically an example of the effect of the geometry of the side panels 101, 102, 301, 302, in this example side panels 301, 302 at the downstream direction. FIG. 10a shows the flow at exit from the divergent section 3 as turbulence 310 may be created at the tips of the side panels 301, 302. In one embodiment the side panels 303, 304 of the divergent section 3 may have a curved or airfoil profiled section to provide desired flow effects, in the example of FIG. 10b shown as a more laminar flow. In some cases, turbulent effects downstream may be beneficial for increasing the pressure differential across inlet and outlet of the turbine 21, i.e. across the convergent section 1 and divergent section 3.

Figure 10C:
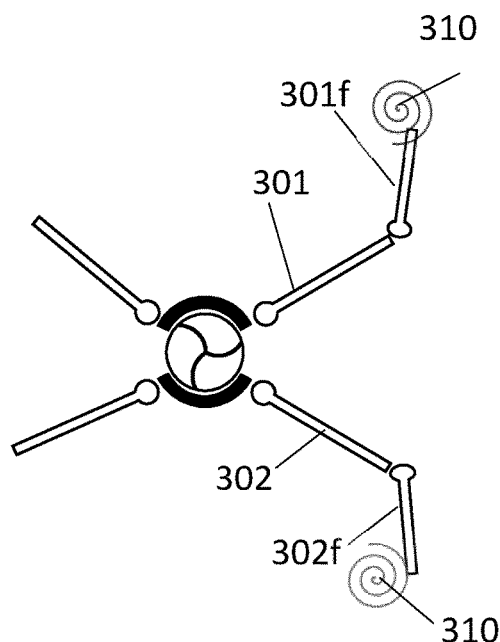
FIG. 10c illustrates schematically one embodiment where turbulent effects downstream are intentionally created through the use of flaps.

FIG. 10c illustrates schematically one embodiment where turbulent effects 310 downstream are intentionally created through the use of flaps 301f, 302f. These flaps 301f, 302f may pivot or otherwise move and adapt their geometry in order to enhance or diminish these downstream turbulent effects 310 depending on wind speed and system power performance. The system may comprise the flaps 301f, 302f. The flaps 301f, 302f may be mounted to and/or extend from the outer ends of the side panels 301, 302 of the divergent section 3 away from the at least one turbine 21. The flaps 301f, 302f may be mounted to pivot relative to the outer ends of the side panels 301, 302.

Figure 10D:
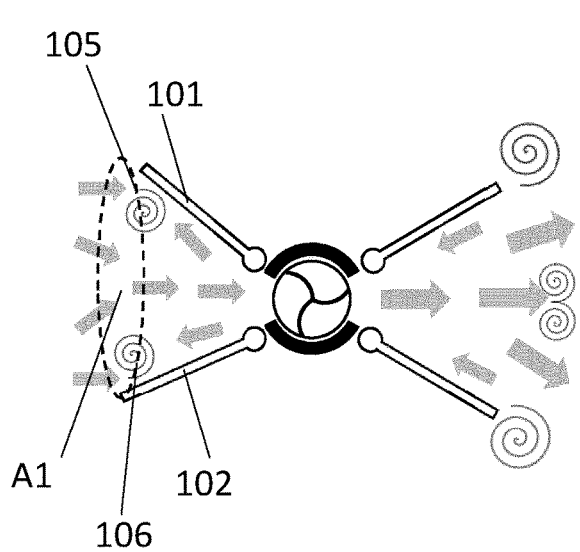
FIGS. 10d and 10e illustrate schematically an example of the effect of the geometry of the side panels, in this example side panels at the upstream direction.
Figure 10E:
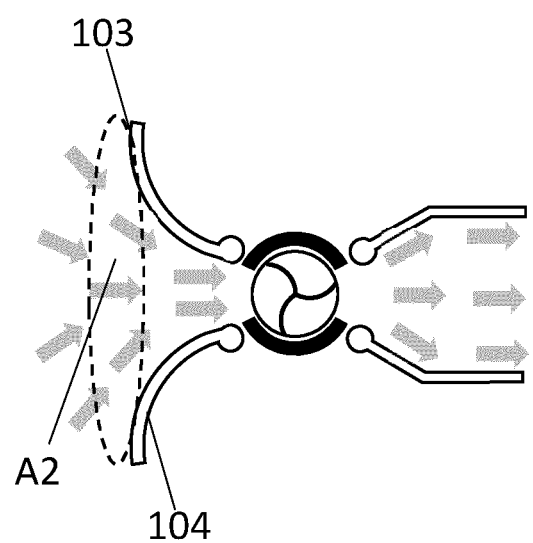

FIGS. 10d and 10e illustrate schematically another example of the effect of the geometry of the side panels 101, 102, in this example side panels 101, 102 at the upstream direction or in the convergent section 1. Side panels 103, 104 are in this example curved. The side panels 103, 104 may be convex as seen from the wind flow side (i.e. from A2 in FIG. 10e). Side panels 103, 104 of a curved profile enable a greater capture area for wind where A2>A1. Another advantage of curved side panels 103, 104 is that flow may be more laminar avoiding turbulence 105, 106 created at the tips of the side panels 103, 104. The exact profile of the side panels 103, 104 can be shaped according to alternative embodiments. The Figures only illustrate general principles by means of examples.

Figure 11:
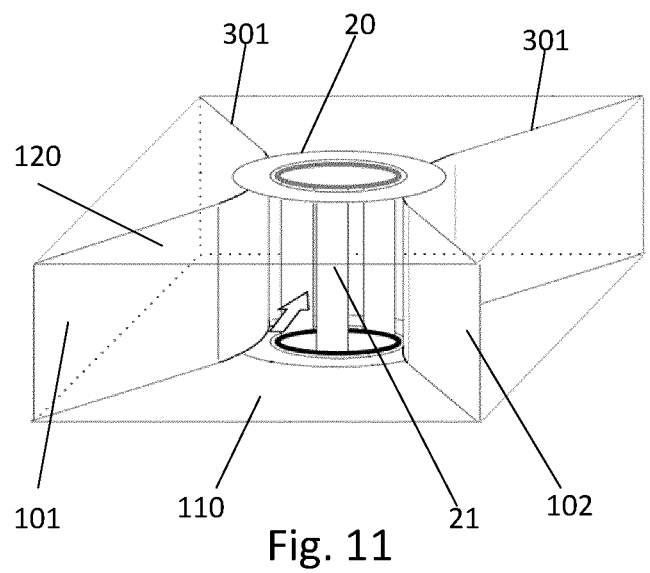
FIG. 11 illustrates one example of a three-dimensional construction of an embodiment of the system of this disclosure.

Many alternative embodiments are possible for the construction of the system. FIG. 11 illustrates one example of a three-dimensional construction of an embodiment the system of this disclosure. On either side of the side panels 101, 102, 301, 302, a floor 110 and a roof 120 are formed. The roof 120 and the floor 110 can take many alternative geometries. FIG. 11 shows by example one embodiment where roof 120 and floor 110 are flat structures. The housing may comprise the roof 120 and floor 110. The turbine-surrounding structure 20, at least one wind turbine 21, convergent section 1, divergent section 3 and side panels 101, 102, 301, 302 may be mounted between the roof 120 and the floor 110. The edges of the side panels 101, 102, 301, 302 adjacent to the roof 120 and floor 110 may be substantially flush therewith such that wind substantially cannot flow therebetween.

Figure 12:
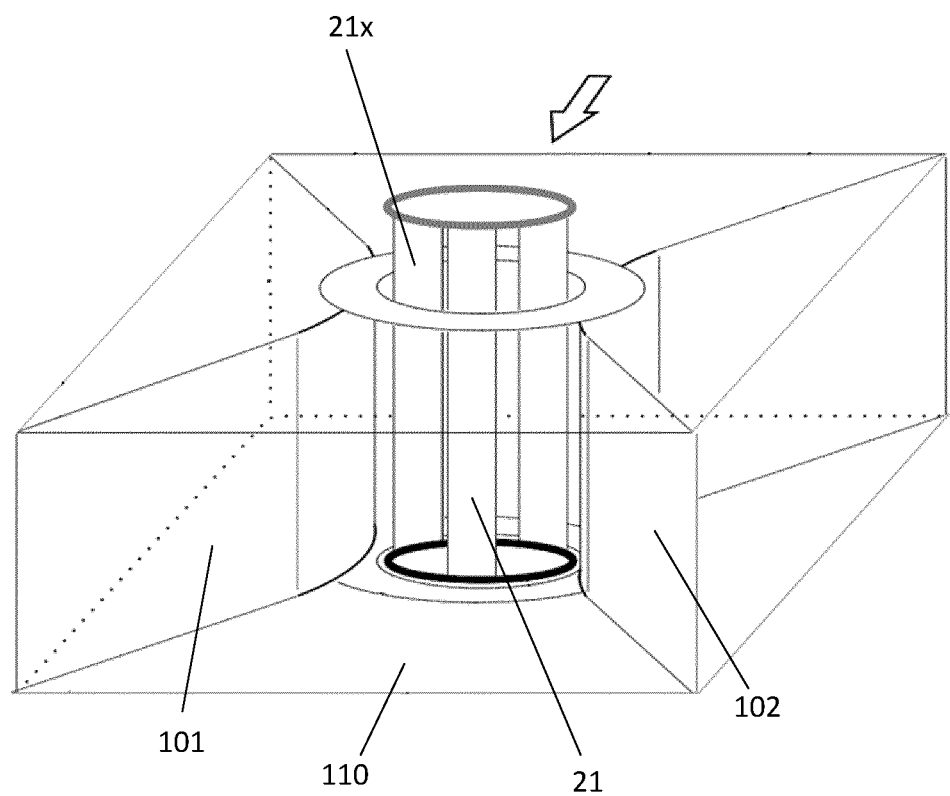
FIG. 12 illustrates one example of a three-dimensional construction of an alternative embodiment of the system of this disclosure wherein the turbine extends above the top surface of the surrounding structure.

FIG. 12 illustrates one example of a three-dimensional construction of an alternative embodiment of the system of this disclosure wherein the turbine 21 extends above the top surface of the turbine-surrounding structure 20 and/or side panels 101, 102, 301, 302. The extension part of the turbine 21 is marked 21x.

Figure 13:
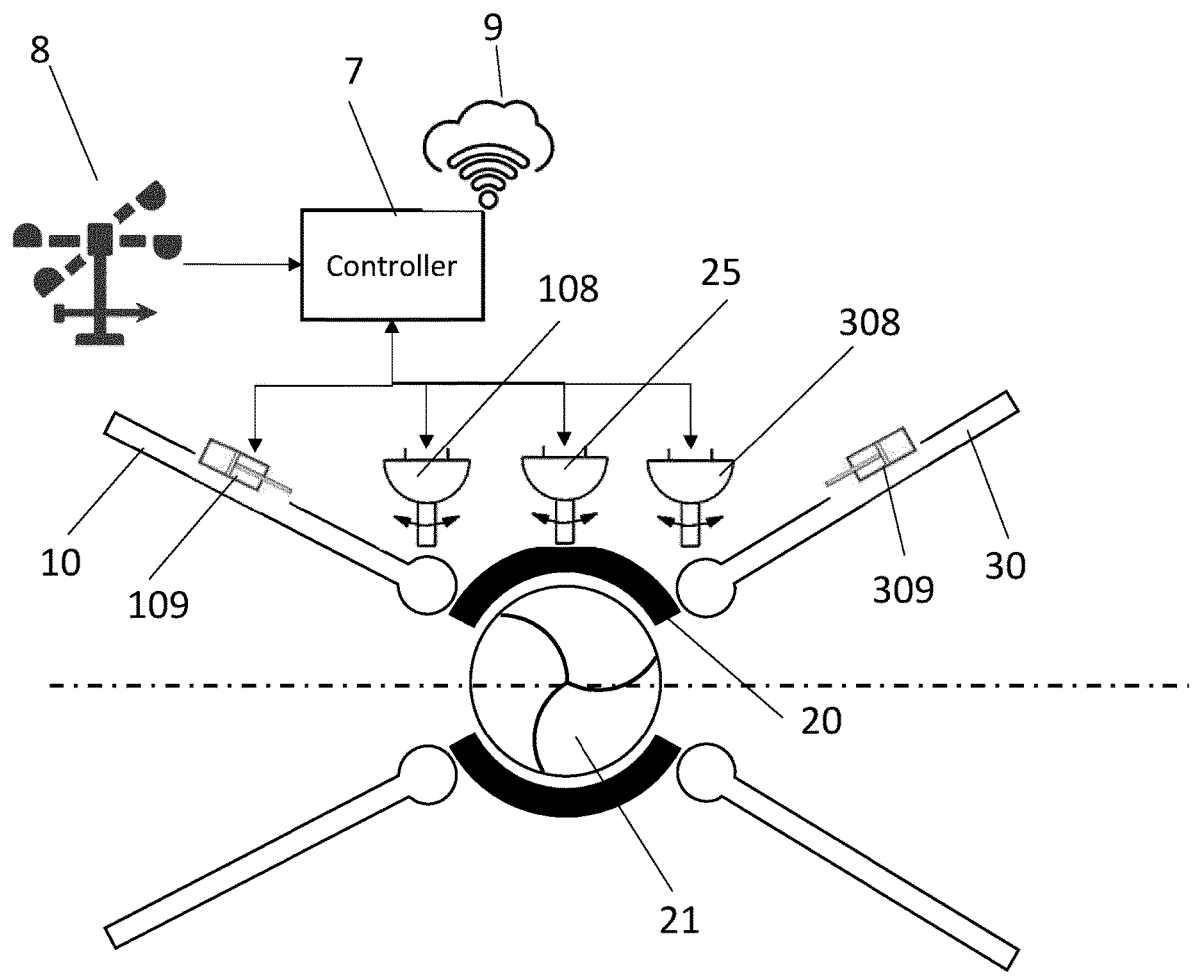
FIG. 13 illustrates one example of a system having a controller and a weather station, with the controller controlling actuators for the movement of the system movable parts.

The system responds to changing wind conditions. To do that, the system comprises a controller 7 directly linked to a weather station 8 and a set of actuators 108, 109, 308, 309, 25 as illustrated by means of example in FIG. 13. The controller 7 is also connected to the cloud 9 (for example an external network) for communication to a remote server or some other remote control and processing device.

The controller 7 comprises a processor and a memory, a software program stored in the memory for running an algorithm to determine optimal system configuration under different wind conditions, and data stored in the memory. This data comprises models of the behaviour of the system, equations or look-up tables. The controller 7 is connected to the actuators 108, 109, 308, 309, 25 and controls these actuators 108, 109, 308, 309, 25 to adapt the geometry of the system in order to achieve optimal performance. The system may comprise first actuators 108, 308 are for controlling the rotation or pivoting of the side panels 101, 102, 301, 302. The system may comprise second actuators 109, 309 are for controlling the extension or retraction in length of the side panels 101, 102, 301, 302. The system may comprise actuators 25 for controlling the rotation of the turbine-surrounding structure 20.

The controller 7 may make decisions by combining current measurements and historical data. The objective sought by the algorithm run by the controller 7 is to maximise the energy harvested over a time period. This time period can comprise minutes, hours and/or days and the exact time period is determined dynamically based on measured and forecasted weather data and historical data that includes weather conditions, power efficiency and energy yield.

The controller 7 is connected via wireless connection to the internet, the cloud 9 and via the cloud 9 to remote server or other devices. Other devices may include for example a smart phone of a responsible person. It is possible for controller 7 decisions to be externally overwritten. Data communication via the wireless connection comprises the transmission of data about system status, system performance, weather and other measurements. It further comprises the receiving of data about weather forecast, other relevant data.

The controller 7 takes decisions by combining current measurements and historical data. Historical data may concern wind speed and direction as well as instantaneous electrical power produced by the turbine 21. The controller 7 takes decisions also considering system stability in view of measured or anticipated perturbations (changes are relatively high frequency) of the wind speed and direction. In some many cases it may be preferred to sacrifice some performance in terms of energy harvested in order to safeguard the stability of the system.

The invention claimed is:

1. A system for harnessing energy from wind, said system comprising:
a convergent section, said convergent section comprising an entry and an exit, said entry having an area higher than said exit;
a wind turbine section adjacent to said exit of said convergent section, said wind turbine section comprising at least one wind turbine;
a divergent section adjacent to said wind turbine section, said divergent section comprising an entry and an exit, said entry having an area lower than said exit, wherein at least one of the convergent section and the divergent section comprises side panels extending away from the wind turbine section, characterised in that:
at least two of said side panels are modifiable in use for maximising the amount of energy harnessed within a time interval in accordance with wind direction and/or wind speed;
said wind turbine section comprises a turbine-surrounding structure that at least partially surrounds said at least one wind turbine, wherein said turbine-surrounding structure:
has openings for wind to pass from the convergent section, through the turbine section, and exit to the divergent section;
is rotatable around the at least one wind turbine in use, such that the orientation of the turbine-surrounding structure and its opening are adjustable relative to the side panels; and
comprises two walls separated from each other by the openings, wherein said walls of said turbine-surrounding structure can rotate independently so that the angles and/or sizes of the openings can vary depending on wind conditions in order to optimise system performance.

2. A system according to claim 1 wherein said turbine-surrounding structure is adjustable in use by being rotatable in use for accommodating changes in wind direction.

3. A system according to claim 1, further characterised in that said turbine-surrounding structure is able to rotate at least 90 degrees about a centre axis of said turbine-surrounding structure or a rotational axis of the at least one wind turbine.

4. A system according to claim 1, wherein said walls of said turbine-surrounding structure are connected and rotate in unison so that the angles and/or sizes of the openings remain constant.

5. A system according to claim 1, wherein said side panels can rotate independently or in unison in accordance with wind conditions for achieving optimal system performance.

6. A system according to claim 1, further characterised in that said system comprises a primary axis and a secondary axis, wherein the primary axis defines the primary orientation of the system and the secondary axis is essentially perpendicular to the primary axis, and wherein the primary axis defines the air flow direction from the convergent section, through the turbine section, to the divergent section when the openings of the turbine-surrounding structure are aligned to the primary axis, and wherein said system is installed to a fixed structure such as a roof of a building with the primary axis aligned to the prevailing wind direction according to the regional wind rose.

7. A system according to claim 1, wherein said side panels rotate about fixed pivot points, characterised in that said pivot points are adjacent to the turbine-surrounding structure of the turbine section.

8. A system according to claim 1, wherein said side panels rotate to maintain an optimal inlet angle formed between the side panels of the convergent section in relation to an outlet angle formed between the side panels of the divergent section.

9. A system according to claim 1, wherein said side panels are extendable or retractable to change their length for achieving optimal performance according to wind conditions.

10. A system according to claim 1, wherein said side panels are both rotatable and changeable in length, and said turbine-surrounding structure are rotatable, in a coordinated manner for achieving optimal performance according to wind conditions.

11. A system according to claim 1, wherein the turbine-surrounding structure is essentially cylindrical having a concave shape as seen from the turbine side.

12. A system according to claim 1, wherein the turbine-surrounding structure is curved having a convex shape as seen from the turbine side.

13. A system according to claim 1, further comprising:
a set of actuators to effect movement of the moving parts of the system, wherein the moving parts comprise side panels and the turbine-surrounding structure;
a wind measuring station to measure wind speed and direction;
a controller comprising a processor and memory;
a software program stored in the memory, said software program being configured to run an algorithm to determine optimal system configuration under different wind conditions;
data stored in the memory, said data comprising models of the behaviour of the system, equations or look-up tables,
wherein the controller is configured to, by the processor, take decisions for controlling the actuators to adapt the geometry of the system for achieving optimal performance over a time period.

14. A system according to claim 1, further comprising a communication module for connecting to the internet and enabling communication of data, wherein said data is related to system status, system performance, weather and/or other measurements, and wherein the communication module is configured to receive data relating to a weather forecast, other data and/or possible overwrite instructions.

15. A system according to claim 1, further comprising an envelope enclosure, wherein said envelope enclosure allows wind to pass through the system unobstructed and provides safety for people and animals by preventing their direct access to moving parts of the system.

16. A method of operating a system for harnessing energy from wind, the system comprising:
a convergent section, said convergent section comprising an entry and an exit, said entry having an area higher than said exit;
a wind turbine section adjacent to said exit of said convergent section, said wind turbine section comprising at least one wind turbine;
a divergent section adjacent to said wind turbine section, said divergent section comprising an entry and an exit, said entry having an area lower than said exit;
wherein at least one of the convergent section and the divergent section comprises side panels extending away from the wind turbine section,
further wherein the wind turbine section comprises a turbine-surrounding structure that at least partially surrounds said at least one wind turbine and comprising openings for wind to pass from the convergent section, through the turbine section and exit to the divergent section, wherein the turbine-surrounding structure comprises two walls separated from each other by the openings, wherein said walls of said turbine-surrounding structure can rotate independently, wherein the method comprises operating the system by:
modifying at least two of the side panels for maximising the amount of energy harnessed within a time interval in accordance with wind direction and/or wind speed;
rotating the turbine-surrounding structure around the at least one wind turbine, thereby adjusting the orientation of the turbine-surrounding structure and its opening relative to the side panels;
rotating the walls of the turbine-surrounding structure independently to vary the angles and/or sizes of the openings depending on wind conditions, in order to optimise system performance.

17. A method as claimed in claim 16 wherein modifying at least two of the side panels comprises adjusting an angle between at least two adjacent side panels and/or extending or retracting the side panels to adjust their length.

18. A method as claimed in claim 16 wherein rotating the turbine-surrounding structure comprises adjusting the orientation of the turbine-surrounding structure and its opening relative to the at least one wind turbine.

* * * * *